TRAVELING STRING-LINE FOR BITUMINOUS PAVERS

Original Filed Dec. 20, 1963 6 Sheets-Sheet 1

INVENTOR.
VERNON L. SCHRIMPER
BY
Harve E. Simmons
ATTORNEY

TRAVELING STRING-LINE FOR BITUMINOUS PAVERS

INVENTOR.
VERNON L. SCHRIMPER
BY *Harm E. [signature]*
ATTORNEY

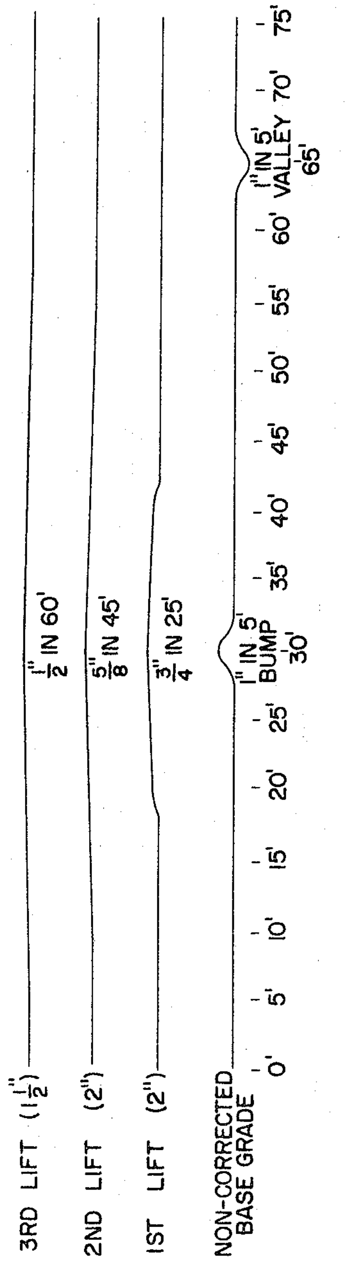

SEMI-RIGID TUBULAR BEAM SINGLE 20' LENGTH (SEE FIGS 1 AND 2)

FIG 4

SURFACE CONDITIONS (THEORETICAL)

| IF 10' BUMP-O-METER USED TO CHECK SURFACE ROUGHNESS READINGS WOULD BE: (APPROX.) | | MAXIMUM HEIGHT OF BUMPS IN EACH LIFT (10' LENGTH) | |
|---|---|---|---|
| NON-CORRECTED BASE GRADE | 2" VERTICAL IN 40' = 264 IN/MILE | BASE GRADE | ±1" |
| 1ST LIFT | $\frac{7}{8}$" VERTICAL IN 40' = 115 IN/MILE | 1ST LIFT | ±$\frac{5}{16}$" + $\frac{1}{4}$" |
| 2ND LIFT | $\frac{3}{8}$" VERTICAL IN 55' = 36 IN/MILE | 2ND LIFT | ±$\frac{1}{8}$" |
| 3RD LIFT | $\frac{1}{4}$" VERTICAL IN 70' = 19 IN/MILE | 3RD LIFT | ±$\frac{1}{16}$" |

NOTE:
ALL ILLUSTRATIONS NEGLECT ROLLER CRUSH DUE TO DIFFERENTIAL MAT THICKNESS OF THE INDIVIDUAL LIFTS

INVENTOR.
VERNON L. SCHRIMPER
BY [signature]
ATTORNEY

TRAVELING STRING-LINE FOR BITUMINOUS PAVERS

Original Filed Dec. 20, 1963 6 Sheets-Sheet 4

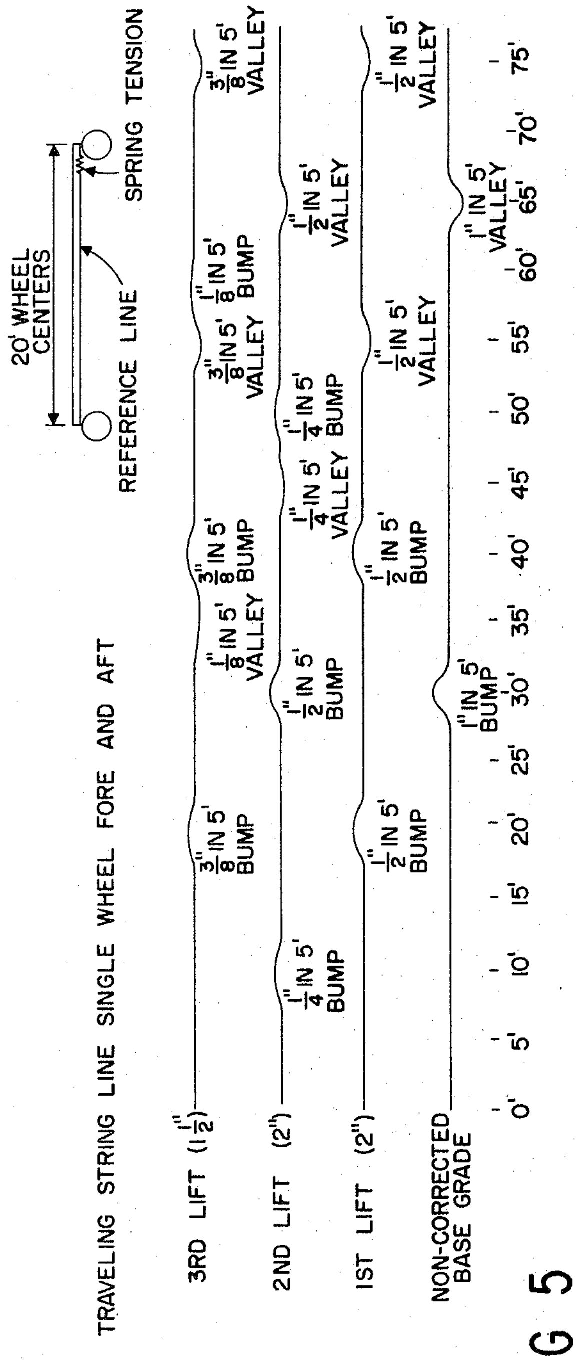

FIG 5

| SURFACE CONDITIONS (THEORETICAL) | |
|---|---|
| IF 10' BUMP-O-METER USED TO CHECK SURFACE ROUGHNESS READING WOULD BE: (APPROX.) | MAXIMUM HEIGHT OF BUMPS IN EACH LIFT (10' LENGTH) |
| NON-CORRECTED BASE GRADE 2" VERTICAL IN 40' =264 IN/MILE | BASE GRADE ±1" |
| 1 ST LIFT 2" VERTICAL IN 60' =176 IN/MILE | 1 ST LIFT ±1/2" |
| 2 ND LIFT 2" VERTICAL IN 80' =132 IN/MILE | 2 ND LIFT ±1/2" |
| 3 RD LIFT 2" VERTICAL IN 100' =106 IN/MILE | 3 RD LIFT ±3/8" |

NOTE:
ALL ILLUSTRATIONS NEGLECT ROLLER CRUSH DUE TO DIFFERENTIAL MAT THICKNESS ON THE INDIVIDUAL LIFTS

INVENTOR.
VERNON L. SCHRIMPER
BY [signature]
ATTORNEY

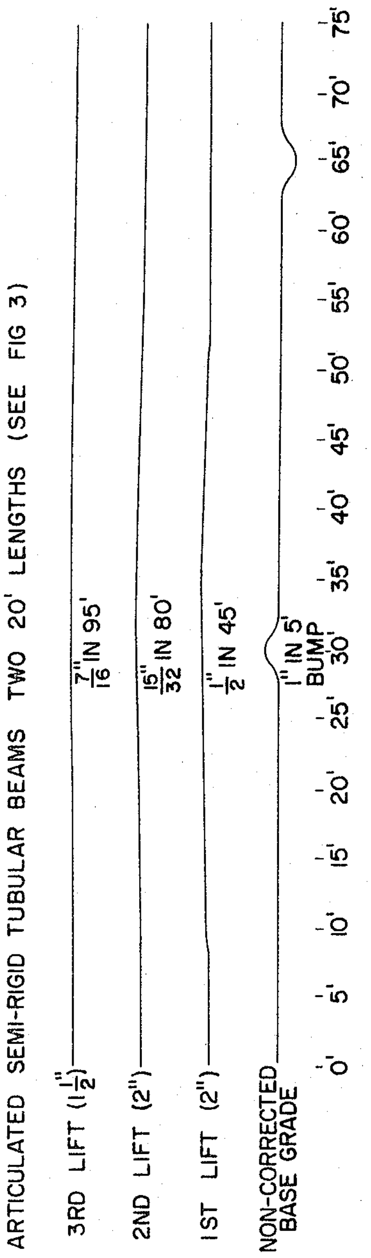

SURFACE CONDITIONS (THEORETICAL)

| | IF 10' BUMP-O-METER USED TO CHECK SURFACE ROUGHNESS READING WOULD BE: (APPROX.) | | MAXIMUM HEIGHT OF BUMPS IN EACH LIFT (10' LENGTH) |
|---|---|---|---|
| NON-CORRECTED BASE GRADE | 2" VERTICAL IN 40' = 264 IN/MILE | BASE GRADE | ±1" |
| 1ST LIFT | 3/8" VERTICAL IN 45' = 73 IN/MILE | 1ST LIFT | ±3/16" + 1/8" |
| 2ND LIFT | 3/8" VERTICAL IN 80' = 25 IN/MILE | 2ND LIFT | ±3/32" |
| 3RD LIFT | 1/4" VERTICAL IN 95' = 14 IN/MILE | 3RD LIFT | ±1/16" |

FIG 6

NOTE
ALL ILLUSTRATIONS NEGLECT ROLLER CRUSH DUE TO DIFFERENTIAL MAT THICKNESS ON THE INDIVIDUAL LIFTS

INVENTOR.
VERNON L. SCHRIMPER
BY [signature]
ATTORNEY

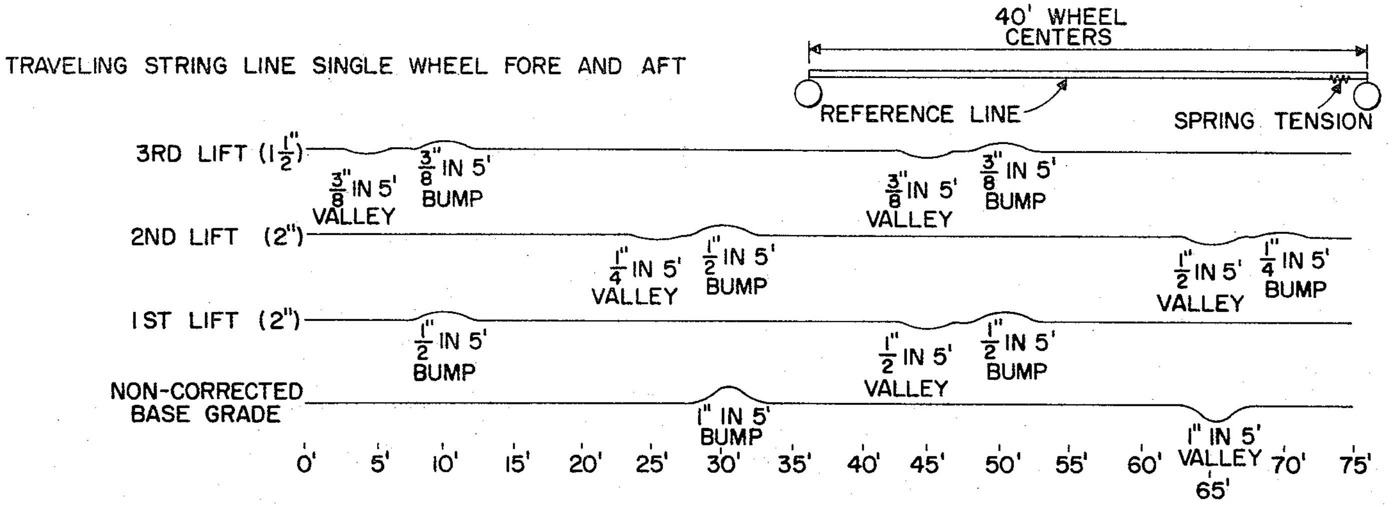

FIG 7

| SURFACE CONDITIONS (THEORETICAL) | | | |
|---|---|---|---|
| IF 10' BUMP-O-METER USED TO CHECK SURFACE ROUGHNESS READINGS WOULD BE: (APPROX.) | | MAXIMUM HEIGHT OF BUMPS IN EACH LIFT (10' LENGTH) | |
| NON-CORRECTED BASE GRADE | 2" VERTICAL IN 40' = 264 IN/MILE | BASE GRADE | ± 1" |
| 1ST LIFT | 2" VERTICAL IN 80' = 132 IN/MILE | 1ST LIFT | ± 1/2" |
| 2ND LIFT | 2" VERTICAL IN 120' = 88 IN/MILE | 2ND LIFT | ± 1/2" |
| 3RD LIFT | 2" VERTICAL IN 160' = 66 IN/MILE | 3RD LIFT | ± 3/8" |

NOTE:
ALL ILLUSTRATIONS NEGLECT ROLLER CRUSH DUE TO DIFFERENTIAL MAT THICKNESS ON THE INDIVIDUAL LIFTS

INVENTOR.
VERNON L. SCHRIMPER
BY [signature]
ATTORNEY

United States Patent Office 3,323,427

Patented June 6, 1967

3,323,427

TRAVELING STRING-LINE FOR BITUMINOUS PAVERS

Vernon L. Schrimper, Cedar Rapids, Iowa, assignor to Iowa Manufacturing Company of Cedar Rapids Iowa, Cedar Rapids, Iowa, a corporation of Iowa Continuation of application Ser. No. 332,042, Dec. 20, 1963. This application June 6, 1966, Ser. No. 555,943
5 Claims. (Cl. 94—46)

This application is a continuation of application Ser. No. 332,042, filed Dec. 20, 1963, and now abandoned.

This invention concerns bituminous road surfacing machines, particularly an attachment therefor which provides a self-contained grade reference line carried by the machine which minimizes minor irregularities in the roadway encountered by the machine as it moves therealong.

Modern bituminous pavers, in order to achieve the highest standards of road surface, usually employ various automatic devices to maintain the finished mat surface as close to the desired grade and slope as possible. Such a paver is described and illustrated, for instance, in U.S. Patent 3,111,070 to Harold C. Pollitz and utilizes a grade sensor extending laterally outwards from one of the screed arms to sense rise or fall of that side of the tractor unit as the machine passes along the roadway. Any deviation from the grade line, owing to minor irregularities in the roadway, is fed by the sensor to a control center which in turn activates certain screed adjusting mechanism to maintain the proper screed attitude. A separate sensor and circuit is employed to control slope.

Essential to all such pavers, whatever particular form their automatic control may take, is a pre-determined grade reference line. The latter may be an adjacent strip of new mat, an old road surface, or a "string-line" elevated on stakes above either the old road surface or the new roadway, as the case may be, and congruent with the desired grade line thereof. Obviously, laying a fixed string-line is a tedious and expensive task, and thus it is the chief object of the present invention to provide a device, carried by the paver itself, which in most cases eliminates the need of a fixed string-line by more effectively minimizing minor irregularities in the roadway than do other devices currently in use for the same purpose. The invention is not intended as a substitute for careful preparation of the basic roadway grade, in the case of a new road surface, but rather more effectively to eliminate and/or reduce the effects upon the paver of relatively small irregularities such as high spots or depressions, of less span than the length of the paver, which would otherwise require a string-line to accomplish. Likewise, the need for a fixed string-line when resurfacing an old roadway having such minor irregularities therein is also more effectively removed by the present invention.

Briefly summarized, the present invention employs a self-contained, "traveling string-line" attached to the paver and incorporating a long ski laterally disposed from and parallel to the side of the tractor upon which the grade sensor is active. The ski is secured to each end of the tractor so that it is both dragged along the roadway as the tractor proceeds therealong and at the same time is independent of any rise or fall of its side of the tractor. In its primary form, a single ski, about two to three times the length of the paver's track base, is used and is sufficient to deal with the kind of roadway irregularities with which the present invention is concerned. Preferably, the ski is semi-flexible so that it will deflect by its own weight should it pass over a high spot in the roadway. A taut, wire string-line is stretched between adjacent the ends of the ski and disposed such that the grade sensor is in contact with the midpoint of the string-line throughout travel of the paver along the roadway. A spring is interposed in the string-line to maintain it taut regardless of any deflecion of the ski. Accordingly, should the forward end of the ski encounter a high spot in the roadway, initial rise of the midpoint of the string-line, and thus the grade sensor, will be less than that of the forward end of the ski. At the same time, and especially as the ski proceeds on over the high spot, its deflection also both minimizes elevation of the string-line and spreads out whatever string-line deviation may occur over a longer stretch of the roadway. Stated another way, both the extent and the rate of the string-line's elevation are greatly reduced by the semi-flexibility of the ski which tends to absorb some of the deviation which would otherwise be transmitted to the string-line. If, instead, the ski should encounter a depression in the roadway, no deviation of the string-line will ordinarily occur. Should some deflection of the ski nevertheless occur, the string-line, being maintained taut, will fall only relatively slightly and gradually. An alternate, more elaborate and effective form of the invention employs two such skis, each approximately two to three times the length of the paver's track base and pivotally linked end to end so each may be angularly displaced relative to and independently of the other. The pivot joint is disposed approximately abreast of the grade sensor, the forward ski being attached to the forward end and the after ski to the rear end of the paver. The string-line itself extends between the midpoints of the two skis.

Either form of the invention achieves a great reduction in the effect of minor irregularities in the roadway upon the new mat surface. Its effectiveness is made particularly impressive when its results are compared, as is done in detail in the appended charts, with other "traveling string-line" devices, such as those employing a wheel at each end of a rigid framework carrying the string-line. The latter will not "bridge" depressions in the roadway into which either wheel may drop. Though they will somewhat reduce the effect of a high spot, yet, because lacking the semi-flexibility of the present invention, they cannot reduce the rate of deviation of the string-line and thus spread out the rise caused by the high spot. The foregoing features and effects, as well as others, of the present invention are further amplified and illustrated in the following more detailed description of the two preferred forms of the invention and in the drawings thereof, in which:

FIGURES 4–7 are charts comparing the results achieved with the apparatus of FIGURES 1–3 with those achieved with a conventional type of traveling string-line.

Figure 1:
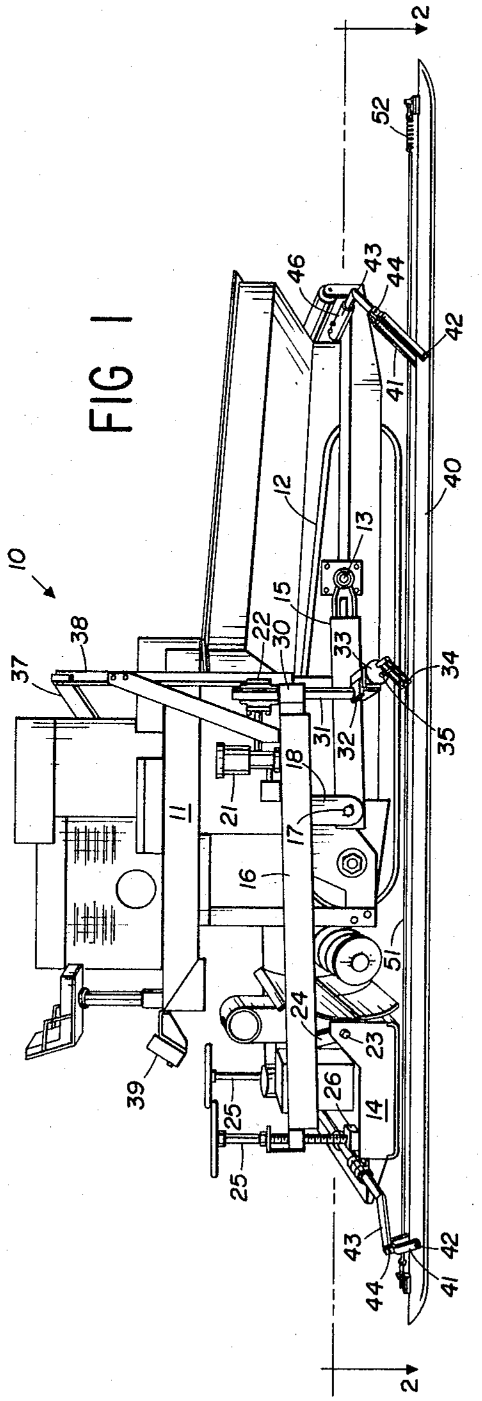
FIGURE 1 is a somewhat diagrammatic, side elevation of an automatically controlled bituminous paver with one preferred form of the invention attached thereto.

Turning then to the drawings, 10 designates generally a bituminous paver having a tractor unit 11 carried on crawlers 12. On the frame of tractor 11 between the sprocket and idler wheels of crawlers 12 a pair of transverse trunnions 13 extend horizontally outwards to which the screed assembly 14 is connected by means of a pair of forward pull arms 15 and a pair of trailing screed arms 16 spaced vertically thereabove. Each pull arm 15 is pivoted at its forward end to one of trunnions 13 and at its rear end at 17 to a pair of straddling, laterally spaced ears 18 depending from the screed arm 16 thereabove. Both screed arms 16 extend forward of their pivots 17 and threadedly receive a pair of vertical, screed arm adjusting screws 19, the lower ends of which are swivelly secured at 20 atop pull arms 15 therebelow and the upper ends of which are driven by servo-motors 21 through suitable gear boxes 22. Screed assembly 14 is pivoted at 23 at its forward corners to a pair of laterally spaced brackets 24 depending from screed arms 16, the latter continuing rearwardly therefrom to threadedly receive a pair of manually operated screed adjusting screws 25, of conventional type, the lower ends of which are swivelly secured at 26 at the after corners of screed assembly 14 therebelow.

A pair of split sleeves 30, extending laterally outwards from the forward ends of screed arms 16, receive a pair of vertical posts 31, slidably adjustable in sleeves 30, to the lower ends of which are secured a pair of grade sensor mounting brackets 32 extending laterally outwards therefrom. To brackets 32, in turn, are fixed grade sensors 33, to the one of which being employed at the time is clipped a sensor grid 34, rotable about a horizontal, transverse axis 35 to sense rise or fall of that side of tractor 11 and activate sensor 33. A slope sensor 36 is mounted centrally of a transverse gantry beam 37 pivotally supported at each end upon columns 38 seated atop screed arms 16 adjacent posts 31. Signals from grade sensor 33 and slope sensor 36 are fed to servo-control box 39 controlling the operation of servo-motors 21. Further details of paver 10, especially the electronic control system, are found in the aforesaid Patent 3,111,070 to Pollitz to which reference may be made.

Figure 2:
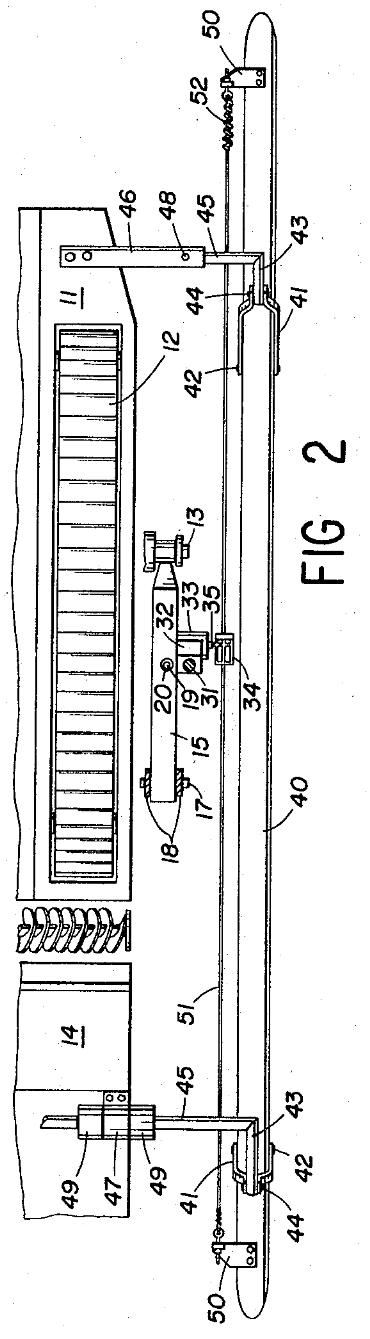
FIGURE 2 is a partial top plan view taken along the line 2—2 of FIGURE 1.

The preferred form of the invention illustrated in FIGURES 1 and 2 employs a single ski 40, about two to three times the length of the track base of paver 10 and of round, semi-flexible tubing, having closed, beveled ends, disposed laterally outwards from paver 10 parallel to its longitudinal axis and approximately centrally with respect to grade sensor 33. The foregoing disposition is accomplished by means of a pair of inverted forward and after trailing yokes 41, the arms of which straddle and are transversely pivoted at 42 to ski 40 abreast of the forward and after ends of paver 10, respectively. The necks of yokes 41 are split to receive therebetween the longitudinally cranked, trailing ends 43, transversely pivoted thereto at 44, of a pair of transverse forward and after carrying arms 45. The respective inner ends of the latter are slidably received in a transverse sleeve 46 mounted to the forward end of paver 10 and in a pair of transversely spaced pillow blocks 47 mounted along the rear end of screed assembly 14. Forward arm 45 is adjustably fixed in its sleeve 46, as by set screw 48, while after arm 45 is freely rotatable in pillow blocks 47 and is adjustably maintained therein by means of suitable lock collars 49 thereon sandwiching one of pillow blocks 47 therebetween.

Accordingly, ski 40 is articulated with respect to paver 10 at two transverse axes 42 and 44 at its forward connection thereto and at three transverse axes 42, 44 and 47 at its after connection thereto. Consequently, the laeral disposition of ski 40 with respect to paver 10 will be maintained as it is dragged along the roadway thereby, while at the same time it will be independent of any rise or fall of its side of tractor 11. A pair of generally triangular string-line brackets 50 are secured atop ski 40 and extend laterally toward paver 10 from adjacent their respective ends of ski 40. Between the outer ends of brackets 50 a wire string-line 51 is secured and maintained taut by an extensible helical spring 52 interposed therein.

As an example, a construction and material suitable for ski 40 employs a single 20 foot length of 3½ inch O.D. mild steel tubing having a 1⁄16 inch wall thickness and a string-line 51 of 20 gauge, oil tempered steel wire, the tensioning spring 52 having a working pull of 40 pounds. Such a ski is a little more than two and one-half times the length of the track base of paver 10. Locating the string-line 51 laterally of ski 40 avoids any impairment of the ski's flexibility which might result were string-line 51 located vertically above ski 40, for instance. The lateral position of ski 40 is adjusted, by loosening set screw 48 and lock collars 49, until sensor grid 34, at the midpoint of its rotative travel, rests lightly upon the midpoint of string line 51. Paver 10 is then ready for operation. It will be understood, of course, that ski 40 is also attachable to the other side of paver 10 when the sensor 33 thereof is in operation, a sleeve corresponding to sleeve 46 being provided therefor on the other side of paver 10 at its forward end and a pair of corresponding pillow blocks 47' at its rear end.

Figure 3:
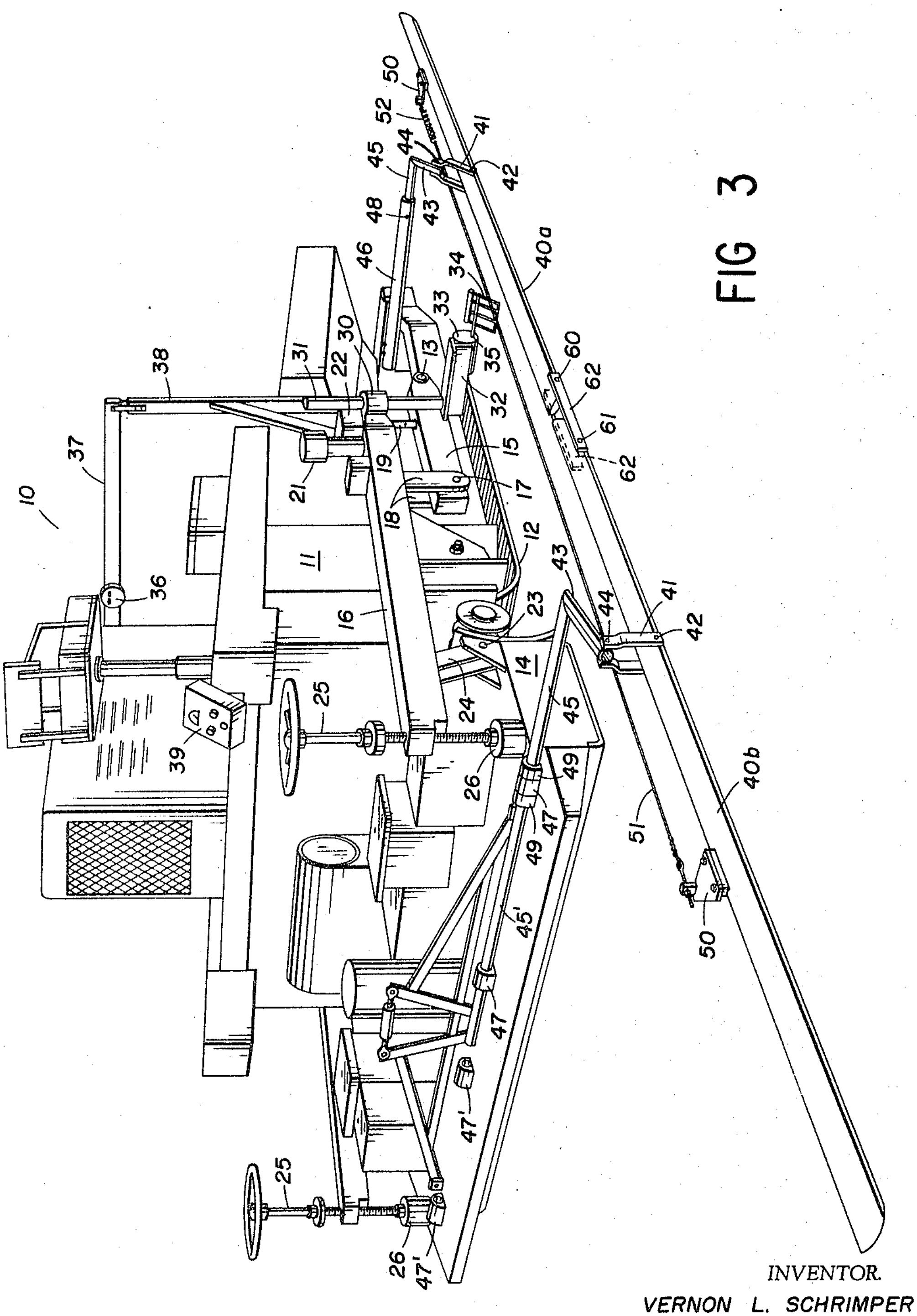
FIGURE 3 is a rear quarter view of the paver of FIGURE 1 with the other preferred form of the invention attached thereto.

In the form of the invention illustrated in FIGURE 3, two skis **40*a* and 40*b*, each substantially identical with ski 40 in FIGURES 1 and 2, are placed end to end and transversely pivotally connected at 60 and 61 to and between a pair of link plates 62 disposed on opposite sides of skis 40*a* and 40*b*, the latter being located longitudinally with respect to paver 10 so that pivots 60 and 61 fall approximately abreast of sensor 33. The string-line brackets 50 are disposed atop skis 40*a* and 40*b*, respectively, at approximately the midpoint of each. In all other respects the structure in FIGURE 3 and its management are the same as that in FIGURES 1 and 2 and identical reference numerals have accordingly been used. The pivots 60 and 61 permit each semi-flexible ski 40*a* and 40*b* to operate substantially independently of the other in the manner of the single ski 40. The independent operation of skis 40*a* and 40*b*, together with attachment of string-line 51 at the midpoint of skis 40*a* and 40*b*, reduces still further the extent, and particularly the rate, of deviation of string-line 51 upon encounter of skis 40*a* and 40*b* with and passage over a high spot, thus spreading the deviation over an even longer stretch of roadway than when a single ski 40** is used.

Of course the longer the ski and string-line the greater the reduction in deviation of the latter by a high spot in the roadway. However, practical considerations, particularly on curves, limit the overall length of the ski to about 40 feet or so which approximately five to six times the length of the track base of the paver illustrated. The important thing is that the length of the ski be substantially greater than the track base of the paver in order to reduce the effect of minor roadway irregularities which the paver's tractor unit is unable to do because of its relatively short track base. Actually, the single, 20 foot ski of FIGURES 1 and 2 has proved to give satisfactory results, as FIGURES 4 and 5 illustrate, without impairing the operation of the paver, especially on curves.

In order to take maximum advantage of the semi-flexible feature of the tubular ski the string-line preferably extends over substantially the entire length of the ski, and disposing the latter so the grade sensor grid rests approximately upon the midpoint thereof provides equal minimization of string-line deviation both fore and aft of the sensor upon passage of the ski over a high spot in the roadway. In the case of the double ski of FIGURE 3 the link connection between the two skis, as a practical matter, largely obviates the necessity for a string-line extending the full distance between the remote ends of the two skis. Indeed, so effective is the link connection that much of the benefits of the present invention would be obtained solely thereby even were each of the two skis rigid instead of semi-flexible.

The charts in FIGURES 4 and 5 illustrate the effectiveness of the form of the invention in FIGURES 1 and 2 using the single 20 foot ski compared with a wheeled traveling string-line of identical wheel base. The line graphs, in particular, show that the effect of a 1" in 5' bump is not only reduced to ¾" but also spread out over a 25' stretch of roadway in the first pass of a paver employing the present invention. On the other hand, the wheeled line reduces the effect of the same bump to ½" but does not spread it out; in fact, the wheeled line produces *two* abrupt deviations, each ½" in 5', for each 1" in 5' bump, one when each wheel passes thereover. Note particularly that the effect of a minor depression or valley is completely removed by the present invention while with the wheeled line not only does the effect thereof remain but again abruptly occurs twice, owing to the two wheels. The second and third lift graphs illustrate the results obtained when the string-line travels on the first lift during deposit of the second layer of mat thereon and then upon the second lift during deposit of the third layer thereon. Observe how, by the time the third lift occurs, use of the present invention has spread out the effect of the original bump from 1″ in 5′ to ½″ in 60′, while use of the wheel string-line still results in abrupt bumps of ⅜″ in 5′ even on the third lift. In the case of a minor valley or depression, none occurs when the present invention is used, but valleys of ⅜″ in 5′ still remain on the third lift when the wheeled line is employed.

The charts in FIGURES 6 and 7 are similar to those in FIGURES 4 and 5 and illustrate use of the form of the invention of FIGURE 3 employing the linked pair of 20 foot skis compared with the use of a wheeled string-line of equal wheel base. Note that by the third lift the 1″ in 5′ bumps is spread ou to 7⁄16″ in 95′ using the present invention, while the wheel line produces two bumps of ⅜″ in only 5′.

While the present invention is designed primarily for use with automatically controlled pavers, it is also equally adapted for use with pavers in which the screed attitude is manually controlled, inasmuch as a form of "sensor" may be employed to detect rise or fall of the tractor relative to the string-line and to display the same visually upon a suitable scale observed by the screed man from which he may then make the necessary screed adjustments. In any case, the following claims are not to be read as limited to the particular devices and applications thereof described and shown in detail herein. Instead, the following claims are to be read as encompassing all modifications and adaptations of the invention falling within the scope and spirit thereof.

I claim:

1. A grade reference device for use with a bituminous road surfacing machine having a tractor unit and grade sensing means laterally disposed from one side thereof, said grade reference device comprising: a pair of elongated forward and after skis in longitudinally aligned end-to-end relation and connectable to the machine so that said skis are disposable generally parallel to the longitudinal axis of the machine and laterally from said side thereof effective to permit said skis to be carried along the roadway in continuous sliding engagement therewith independently of the rise and fall of said side of the machine, said skis being connected at their adjacent ends effective to permit vertical displacement of one ski independently of and relative to the other ski upon longitudinal passage of said one ski over a convexity in the roadway, the overall effective length of said skis being greater than the effective length of the suspension system of the tractor unit, and grade reference means carried by said skis extending between a location on said forward ski and a location on said after ski effective to activate the sensing means during passage of said skis along the roadway when connected to the machine as aforesaid.

2. The device of claim 1 wherein each of said skis is semiflexible and substantially rectilinear and is constituted so as to deflect from its rectilinearity by its own weight upon passage thereof over said convexity, said connection between the adjacent ends of said skis being disposable substantially longitudinally abreast of the sensing means when said skis are connected to the machine as aforesaid.

3. The device of claim 2 wherein said skis comprise uniform tubular members of equal length, and wherein said grade reference means comprises a rectilinear wire member including means maintainnig the rectilinearity of said wire during said passage of said skis along the roadway.

4. The device of claim 3 wherein said connection between said tubular members comprises a pair of links extending between said adjacent ends of said tubular members and transversely pivoted to each.

5. The device of claim 4 wherein the overall length of said tubular members is five to six times said length of the tractor unit, said forward and after members being connectable adjacent the forward and after ends, respectively, of the machine, and wherein said locations of said reference wire member are substantially at the longitudinal midpoints of said forward and after tubular members.

References Cited

UNITED STATES PATENTS

| | | | |
|---|---|---|---|
| 1,967,758 | 7/1934 | Pierce | 33—174 |
| 2,491,275 | 12/1949 | Millikin | 94—46 |
| 2,720,716 | 10/1955 | White | 37—153 |
| 2,962,979 | 12/1960 | McCormick | 104—7 |
| 3,259,034 | 7/1966 | Davin | 94—46 |
| 3,272,099 | 9/1966 | Drake | 94—46 |

FOREIGN PATENTS

| | | |
|---|---|---|
| 457,829 | 2/1951 | Italy. |

CHARLES E. O'CONNELL, *Primary Examiner.*

N. C. BYERS, *Assistant Examiner.*